(No Model.)

M. P. SCOTT.
COTTON CHOPPER.

No. 537,618. Patented Apr. 16, 1895.

WITNESSES:
Chas. Nioll.
C. Sedgwick.

INVENTOR
M. P. Scott
BY
Munn & Co.
ATTORNEYS.

United States Patent Office.

MORSE P. SCOTT, OF WOODVILLE, MISSISSIPPI, ASSIGNOR OF FORTY-NINE ONE-HUNDREDTHS TO THOMAS F. RYDER, OF NEW YORK, N. Y.

COTTON-CHOPPER.

SPECIFICATION forming part of Letters Patent No. 537,618, dated April 16, 1895.

Application filed June 14, 1894. Serial No. 514,659. (No model.)

*To all whom it may concern:*

Be it known that I, MORSE P. SCOTT, of Woodville, in the county of Wilkinson and State of Mississippi, have invented a new and Improved Cotton-Cultivator, of which the following is a full, clear, and exact specification.

My invention relates to an improvement in cotton cultivators, and it has for its object to provide a machine through the medium of which superfluous cotton plants may be chopped from the rows and the rows simultaneously cultivated.

Another feature of the invention is to provide a means whereby the driver may conveniently and expeditiously move the cultivators and choppers either to the right or to the left and thus accommodate the machine to the unevenness of the rows.

A further feature of the invention is to provide a means whereby the cultivators and choppers may be raised to such an extent as to entirely clear the ground.

The invention consists in the novel construction and combination of the several parts, as will be hereinafter fully set forth, and pointed out in the claims.

Reference is to be had to the accompanying drawings, forming a part of this specification, in which similar figures of reference indicate corresponding parts in all the views.

Figure 1:
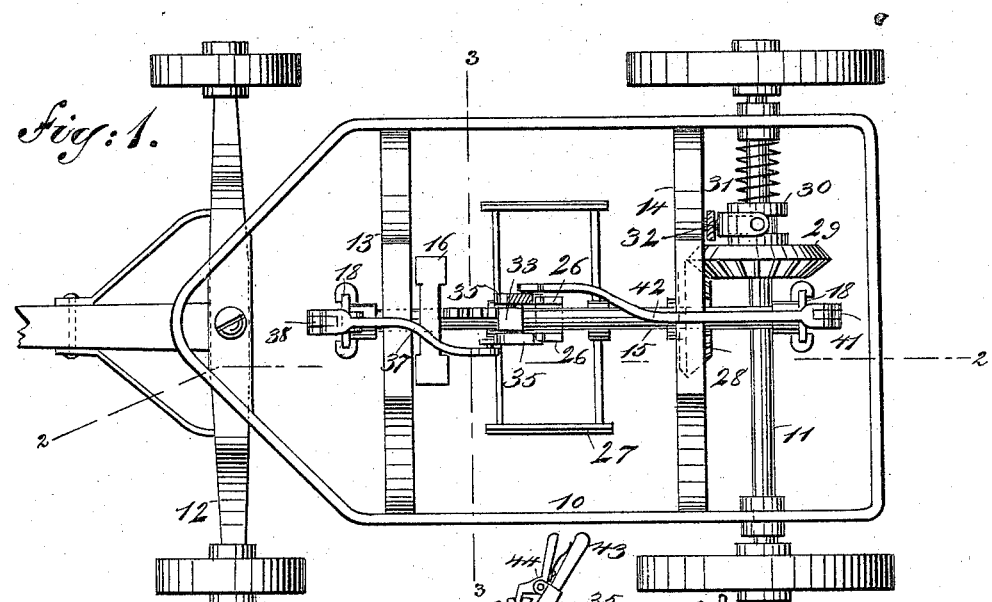
Figure 2:
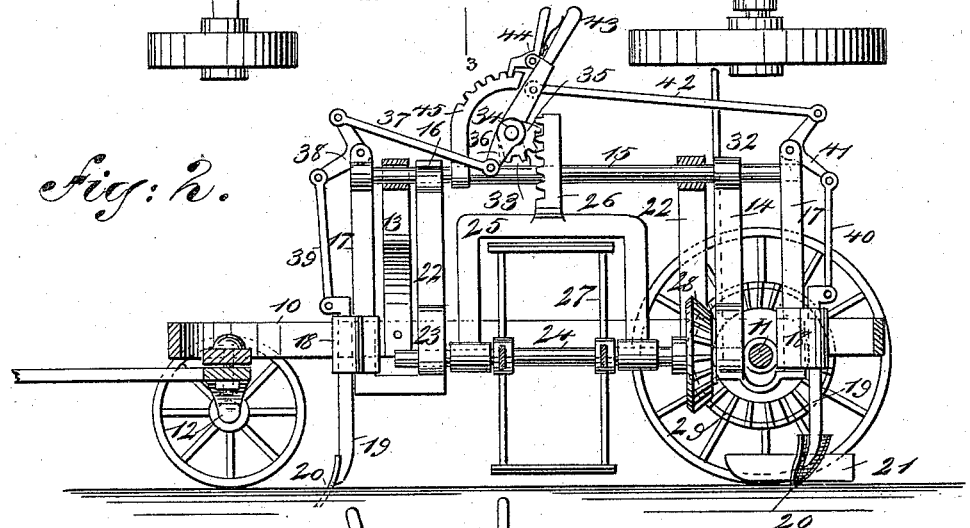

Figure 1 is a plan view of the machine. Fig. 2 is a longitudinal vertical section thereof, taken practically on the line 2—2 of Fig. 1; and Fig. 3 is a transverse vertical section taken essentially on the line 3—3 of Fig. 1.

In carrying out the invention the frame of the machine may be said to consist of a base 10 of substantially skeleton construction, in which base the rear axle 11, is journaled and to which the forward axle 12 is pivotally attached. In addition to the base 10 the frame may be said to consist of vertical hangers or brackets 13 and 14, extending from side to side of the frame near the front and near the rear.

The brackets 13 and 14 serve as supports for an upper longitudinal shaft 15, said shaft being journaled in suitable bearings in the brackets or hangers. The shaft is adapted to be rocked by the driver's feet, and to that end it is provided with a foot plate 16, which usually extends across the shaft beyond opposite sides, being within convenient reach of the driver's feet. At each end of the shaft 15 a bar 17 is secured, and the bars 17, are made to extend vertically downward from the shaft, and are usually made rectangular in cross section. The bars 17, are adapted as guides, as upon each bar a head 18 is held to slide, and each head has preferably secured to it the shanks 19 of two cultivator blades 20, and they face in direction of the front of the machine, and are located a predetermined distance apart.

Figure 3:
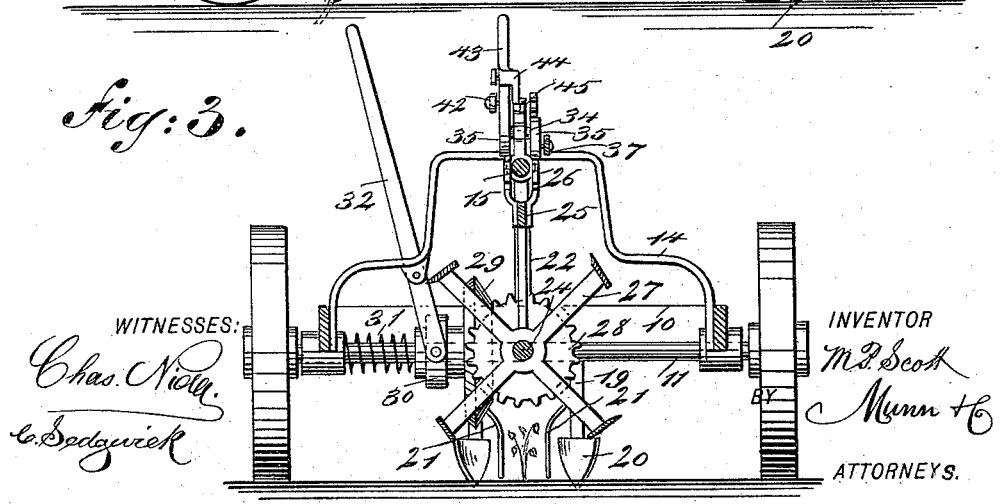

Each set of cultivator blades, as shown in Fig. 3, is preferably provided with shields or guards 21, located between them, being projected downward from the shanks 19 of the cultivators, and the said shields are adapted to travel one at each side of a row of plants, and prevent the plants from being covered up to too great an extent by the action of the cultivator blades.

Hangers 22, are attached to the shaft 15 one near each end, the hangers being preferably located just inside of the main hangers 13 and 14 of the frame. The hangers 22, are rigidly secured to the shaft and extend down therefrom substantially parallel with the guide bars 17. In the lower end of each hanger 22 an elongated bearing 23, is formed, the bearing being lengthened in direction of the length of the hangers. A chopper shaft 24, is guided at its ends in the elongated bearings 23 of the hangers 22. The said shaft 24, is therefore capable of being raised and lowered. The shaft 24 is journaled in the lower ends of a yoke 25, and this yoke is provided with parallel racks 26, extending upward from it at each side of the upper shaft 15. The chopper 27, is secured upon the lower shaft 24 within the yoke, and the said chopper is of somewhat wheel form, consisting of series of spokes radiating from hubs, the spokes being made to carry hoes at their outer ends, each transversely aligning set of spokes supporting a single hoe. The shaft 24, is provided with a beveled pinion 28, which meshes with a beveled gear 29 held to slide upon and turn with the rear axle 11, and through the medium of this gear the chopper shaft 24, is rotated.

The gear 29, is provided with a grooved hub 30, and the gear is held in engagement with the pinion 28 through the medium of a spring 31. When the machine is not in operation the gear 29 is disengaged from the pinion 28 through the medium of a shifting lever 32, which may be, and preferably is, fulcrumed upon the rear upright hanger or bracket 14, and is bifurcated at its lower end to travel in the groove of the hub 30.

At a proper point in the length of the upper shaft 15 a post 33, is firmly secured, and in the said shaft is journaled a short shaft 34, and upon each end of the shaft 34 a segmental gear 35, is firmly attached, the gears being adapted to mesh with the racks 26, emanating from the yoke attached to the chopper shaft. One of the gears 35, is provided with an arm 36, and the said arm is connected by a link 37 with an angle or elbow lever 38, fulcrumed upon the forward end of the upper shaft 15, the lever 38 being connected by a second link 39, with the forward head 18 carrying the forward cultivator blades. The sliding head of the rear cultivator blades is connected by a link 40, with the angle lever 41 located upon the rear end of the shaft 15, and the said lever 41, is connected by a link 42 with a hand lever 43, the said lever being attached to either the opposite mutilated gear 35, or one end of the shaft upon which the gears are located. The lever 43, is provided with a thumb latch 44, which engages with a rack 45 carried by the shaft 15. Thus by manipulating the lever 43 both the forward and the rear cultivator blades, together with the chopper, may be raised or lowered as occasion may demand, and in the operation of the machine the cultivators and choppers may be carried laterally to the right or to the left by the manipulation of the upper shaft 15, and in this manner a row of cotton plants may be cultivated in a proper manner and surplus plants removed, no matter how crooked the line of plants may be. This lateral swinging of the entire chopping mechanism, its adjusting mechanism, and cultivator blades, is due to the fact that the shaft 15, bars 17, and brackets 22 form a pendent frame journaled in the arched brackets 13, 14 and having a freely swinging movement, and as all of the chopping mechanism is mounted on this swinging frame together with the cultivators and all of the adjusting mechanism, the whole swings together.

Having thus described my invention, I claim as new and desire to secure by Letters Patent—

1. In a cultivator, a frame, a longitudinally extending rock shaft carried by the frame, means for rocking the shaft bars or guides depending from the said shaft and rocking with it, and cultivator blades carried by the said bars or guides, as and for the purpose set forth.

2. In a cultivator, a frame, a longitudinally extending rock shaft supported by the frame and provided with depending guides, cultivator blades having vertical sliding movement upon the guides, and lifting mechanism carried by the rock shaft and connected with the cultivator blades, as and for the purpose specified.

3. In a cultivator, the combination, with the frame, a longitudinally extending shaft held to rock in the frame, and depending guides carried by the shaft, of a foot plate located upon the shaft, whereby it and the guides may be rocked, heads held to slide vertically upon the guides and adapted to carry cultivator blades, a lever mounted upon the shaft, and a connection between the said lever and the sliding heads, whereby both heads may be simultaneously manipulated, as and for the purpose specified.

4. A cultivator and chopper comprising an open wheeled frame, a longitudinally extending rock shaft journaled in the upper part thereof, guides and hangers depending from the rock shaft, vertically sliding cultivator heads mounted on the guides, an adjusting mechanism mounted on the said rock shaft and connected with said heads, a vertically adjustable yoke connected at its upper end with said adjusting mechanism, a hoe shaft journaled in the lower ends of the yoke and having vertically guided movement in the lower ends of the hanger and a self adjusting gearing connecting the hoe shaft and main axle regardless of how the hoe shaft is swung laterally to either side with the movement of the rock shaft, substantially as described.

5. In a cotton cultivator, the combination, with a frame, a longitudinally extending rock shaft supported therein, an axle, a spring-controlled driving gear carried by the axle, guide bars projected downward from the rock shaft, and hangers likewise projected from the rock shaft, of heads held to slide upon the guide bars, cultivator blades connected with said heads, a hoe shaft a yoke carrying the hoe shaft guided in the said hangers, hoes carried by the said shaft, a gear connection between the hoe shaft and the rear axle, and an adjusting lever carried by the rock shaft, having lifting connection with both of the heads and with the said yoke, substantially as shown and described.

MORSE P. SCOTT.

Witnesses:
J. FRED ACKER,
JNO. M. RITTER.